(12) United States Patent  
Siahaan et al.

(10) Patent No.: US 9,331,423 B2  
(45) Date of Patent: May 3, 2016

(54) METHODS FOR MAKING DUAL MATERIAL STRAIN-RELIEF MEMBERS FOR CABLES

(71) Applicant: Apple Inc., Cupertino, CA (US)

(72) Inventors: Edward Siahaan, San Francisco, CA (US); John B. Ardisanna, II, San Francisco, CA (US); Kevin M. Keeler, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 434 days.

(21) Appl. No.: 13/631,334

(22) Filed: Sep. 28, 2012

(65) Prior Publication Data

US 2013/0189872 A1 Jul. 25, 2013

Related U.S. Application Data

(60) Provisional application No. 61/589,169, filed on Jan. 20, 2012.

(51) Int. Cl.
| | |
|---|---|
| *H01R 43/00* | (2006.01) |
| *H01R 13/58* | (2006.01) |
| *B29C 45/16* | (2006.01) |
| *B29L 31/36* | (2006.01) |
| *B29L 31/34* | (2006.01) |

(52) U.S. Cl.  
CPC ........ *H01R 13/5845* (2013.01); *B29C 45/1671* (2013.01); *B29C 45/1676* (2013.01); *B29L 2031/3462* (2013.01); *B29L 2031/36* (2013.01); *Y10T 29/49872* (2015.01)

(58) Field of Classification Search  
CPC .. H01R 13/5812; H01R 13/60; H01R 13/639; H01R 23/661; H01R 24/20; H01R 43/26; Y10S 264/61; Y10T 24/3929; Y10T 29/49872  
USPC ............... 29/858, 857, 887, 888.3; 174/77 R, 174/113 R, 135, 652; 264/249, 272.15; 439/447, 449, 455, 465, 470  
See application file for complete search history.

(56) References Cited

U.S. PATENT DOCUMENTS 7,867,015 B1 * 1/2011 Parker ........................... 439/465  
2011/0180303 A1 * 7/2011 Aase et al. ................. 174/113 R

* cited by examiner

*Primary Examiner* — Thiem Phan  
(74) *Attorney, Agent, or Firm* — Van Court & Aldridge LLP

(57) ABSTRACT

Aesthetically pleasing strain-relief members for cables and methods for making the same are disclosed. The strain-relief member include a tapered, inner strain-relief portion and an aesthetically pleasing outer strain-relief portion.

16 Claims, 4 Drawing Sheets

METHODS FOR MAKING DUAL MATERIAL STRAIN-RELIEF MEMBERS FOR CABLES

CROSS-REFERENCE TO RELATED APPLICATION

This application claims the benefit of U.S. Provisional Application No. 61/589,169, filed Jan. 20, 2012, the disclosure of which is incorporated by reference herein in its entirety.

BACKGROUND OF THE INVENTION

Cables are commonly used with electronic devices such as computers, cellphones, and portable media devices. When cables are subject to repeated physical manipulations that exert bend and strain forces on the cable, the cable can eventually break or tear. Smaller diameter cables and cables used in connection with portable electronic devices are especially susceptible to breakage because they are frequently handled by being bent, pulled, tangled, or wrapped. Cable manufacturers have conventionally used strain-relief mechanisms to ease the stress burden on cables. However, many of these conventional strain-relief mechanisms are ineffective or are not aesthetically pleasing.

SUMMARY

Aesthetically pleasing dual material strain-relief members for cables and methods for making the same are disclosed. Strain-relief members according to embodiments disclosed herein can include an inner strain-relief portion and an outer strain-relief portion. The inner strain-relief portion may be tapered or otherwise shaped to permit increasing flexibility along its length. The outer strain-relief portion can be formed from a relatively softer material than the inner strain-relief portion, and it may be shaped to provide an aesthetically pleasing outward appearance. Strain-relief members can be incorporated into the structure of an electronic cable to prevent damage to one or more cable components.

Dual material strain-relief members may be produced according to embodiments disclosed herein. In some embodiments, the inner and outer strain-relief portions may be manufactured separately (e.g., using a molding process). The portions can then be coupled to a cable and connector housing in one or more cable structure assembly steps. In other embodiments, the inner and outer strain-relief portions can each be overmolded at the junction between a cable and a connector housing. The dual material strain-relief member may be secured in place by, for example, retaining at least a portion of the dual material-strain relief member within a connector housing or by employing an adhesive or compressive stress between various cable components.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
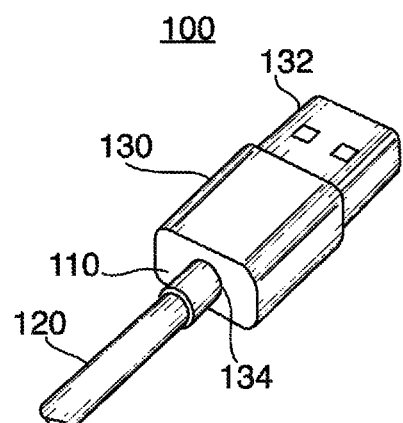
FIG. 1 is a perspective view of an illustrative cable assembly with a dual material strain-relief member in accordance with some embodiments.

FIG. 1 is a perspective view of an illustrative a cable assembly 100 in accordance with some embodiments. Cable assembly 100 can include a dual material strain-relief member 110, a cable 120, a connector housing 130, and a plug 132. In some embodiments, such as the one shown, a portion of dual material strain-relief member 110 can be integrated within connector housing 130. This portion (not shown) is referred to herein as a housing engagement member—see, for example, FIG. 3 for an illustration of housing engagement member 316. This portion can be secured within connector housing 130 with, for example, an adhesive, thermal bond, and/or one or more mechanical clips.

In another embodiment, the housing engagement member of dual material strain-relief member 110 may be coupled to the outer surface of the connector housing 130. Any suitable method for securing dual material strain-relief member 110 may be employed. For example, dual material strain-relief member 110 can be directly coupled to the outer surface of connector housing 130 with an adhesive or thermal bonding.

The strain-relief part of dual material strain-relief member 110, which is the portion shown extending through opening 134 away from connector housing 130, engages cable 120, which passes through dual material strain-relief member 110 and into connector housing 130. The portion of cable 120 that engages dual material strain-relief member 110 is provided with strain relief. In general, strain relief is achieved by increasing the radius of curvature for the cable as it is bent. Embodiments according to this invention may provide strain relief tuned specifically to the type of cable being used in cable assembly 100. For example, some cables may be better suited to have enhanced strain relief in the region of dual material strain-relief member 110 that abuts connector housing 130, whereas other cables may be better suited to have reduced strain relief in that same region. As another example, strain relief may be selectively tuned along the length of dual material strain-relief member 110 based on, for example, the type of cable for which it is providing strain relief.

Dual material strain-relief member 110 can include an inner strain-relief portion and an outer strain-relief portion, each of which may be constructed from silicone, thermoplastic elastomer ("TPE"), polyurethane, or other suitable materials. The inner strain-relief portion may have a tapered shape with the characteristic that the rigidity at any point along its length is proportional to its thickness at that point. This design permits increasing flexibility along the length of dual material strain-relief member 110, resulting in gradually more permissive movement of cable 120.

In some embodiments, the inner and/or outer strain-relief portion may be formed from one or more woven or braided fibers. The fibers may be natural (e.g., cotton or wool) or synthetic (e.g., nylon or rayon). According to some embodiments, the strain-relief portions may be formed from an aramid fiber such as Kevlar. The fibers may be braided with a with a tapered profile that is thick at a first end and thin at a second other end, thus providing stiff strain-relief at the first end and gradually less strain relief along the length of the inner-strain relief portion. The outer strain-relief portion may be formed from a less stiff fiber than the inner strain-relief portion such that the strain relief is controlled mainly by the inner strain-relief portion.

In some further embodiments, the inner strain-relief portion may be formed from several layers of material. For example, one or more materials may be wrapped concentrically in several layers around a cable to create a stepped inner strain-relief member. The material layers may have durometer ratings specifically tuned to provide maximum strain relief for cable 120. The material layers may include woven fibers and/or one or more molded materials (e.g., silicone, thermoplastic elastomer ("TPE"), polyurethane, or other suitable materials). In such embodiments, the number of material layers may determine the strain-relief characteristics of strain-relief member 110. That is, sections of the inner strain-relief portion with more material layers may be less flexible than portions with less material layers. Accordingly, if the material layers are stepped such that the number of material layers diminishes along the length of the inner strain-relief member, the flexibility of dual material strain-relief member 110 can increase along its length.

Furthermore, each of the material layers may be formed from the same or different materials to achieve a desired strain-relief profile. For example, the material layer closest to cable 120 may be formed from a relatively flexible material, and material layers further from cable 120 can be formed from relatively stiffer materials. Thus, if the inner strain-relief portion is formed from stepped material layers, the sections with more material layers of increasingly stiff materials can be less flexible than the sections with less material layers of more flexible materials.

In still further embodiments, inner strain-relief member may be formed from metal (e.g., a wedged or corrugated wire). In these embodiments, the spaces between the wedges or corrugations may be specifically tuned to provide tapered strain relief to cable 120. For example, the wedges or corrugations may be close together (and thus less flexible) at a first end than at a second end. The distance between consecutive wedges or corrugations may be tuned to provide tapered strain relief to cable 120 along the length of dual material strain-relief member 110. In these embodiments, the outer strain-relief portion may be formed from any suitable material to maintain an aesthetically pleasing outward appearance. For example, the outer strain-relief portion may be formed from a molded from a plastic such as, for example, TPE or formed from woven or braided fibers.

The outer strain-relief portion of dual material strain-relief member 110 can be constructed to have an aesthetically pleasing outer surface that has, for example, a smooth and continuous shape. As shown, the outer strain-relief portion has a smooth and uninterrupted cylindrical shape. In contrast, and by way of example, a non-smooth and discontinuous outer strain-relief portion could have corrugations, ridges, cutouts, and/or tapers. In general, the outer strain-relief portion can be constructed of a softer, more flexible material than the inner strain-relief portion such that its contribution to the overall strain relief provided is negligible. However, according to some embodiments, the outer-strain relief portion may be configured to provide additional strain-relief for cable 120 if desired.

Connector housing 130 may provide protection for physical and electrical connections between cable 120 and plug 132 (e.g., solder connections). Connector housing 130 may be constructed from a resilient material (e.g., a plastic or metal). Plug 132 may be any type of electrical connector (e.g., RCA, DVI, HDMI, HDCP, VGA, display port, USB, Mini USB, Micro USB, a power connector, a magnetic connector, a 30-pin connector, or any other standard or proprietary interface) operable to couple a cable (e.g., cable 120) to an electronic device.

Figure 2:
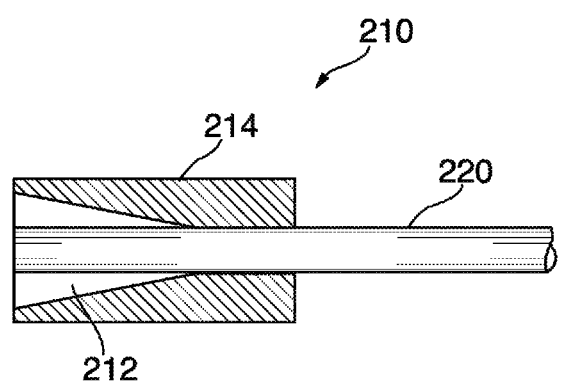
FIG. 2 is a cross-sectional view of a cable assembly including a dual material strain-relief member in accordance with some embodiments.

FIG. 2 is a cross-sectional view of a cable assembly 200 including a dual material strain-relief member 210 in accordance with some embodiments. Dual material strain-relief member 210 can include inner strain-relief portion 212 and outer strain-relief portion 214, which may be coupled to cable 220 as well as other cable components (not shown).

Inner strain-relief portion 212 can have a tapered outer surface in order to achieve a gradual change in rigidity along its length. Although the thickness of inner strain-relief portion 212, as depicted, varies linearly along its length, it may, according to some embodiments, have any suitable shape. For example, inner strain-relief portion may have an exponentially decreasing or a stepped profile based on the desired strain-relief and/or manufacturing requirements. The gradual change in rigidity achieved by these embodiments increases the radius of curvature of cable 220 when it is bent or pulled, reducing the strain focused at any point on the cable and, therefore, reducing the susceptibility of the cable to damage. Inner strain-relief portion 212 may be constructed of a relatively hard material (e.g., having a Type A durometer of ~90).

Accordingly, in some embodiments, inner strain-relief member 212 can be a cone-shaped member that tapers smoothly from a thick base to its apex. Further, inner strain-relief member 212 can have a cylindrically-shaped cable receiving passage along its axis extending from the center of the base to the apex. The cable receiving passage can be configured to engage the outer surfaces of cable 220, for example. In some further embodiments, the general shape of inner strain-relief member 212 can be retained, although the outer surface need not taper smoothly from the base to the apex. For instance, the outer surface of inner strain-relief member 212 can take on any suitable profile (e.g., a stepped profile, an exponential profile, or a parabolic profile) to achieve desired strain-relief characteristics.

Outer strain-relief portion 214 can be configured to form a sleeve around the whole of inner strain-relief portion 212 and a portion of cable 220. The outward appearance of outer strain-relief portion 214 can maintain an exterior cylindrical geometry, regardless of the shape of inner strain-relief portion 212. According to some other embodiments, outer-strain relief portion 214 may include any desired ornamentation that can benefit the appearance of dual material strain-relief member 210. In order to ensure that the strain relief is controlled by inner strain-relief portion 212, outer strain-relief portion 214 may be constructed of a relatively soft material (e.g., having a Type A durometer of ~80).

Figure 3:
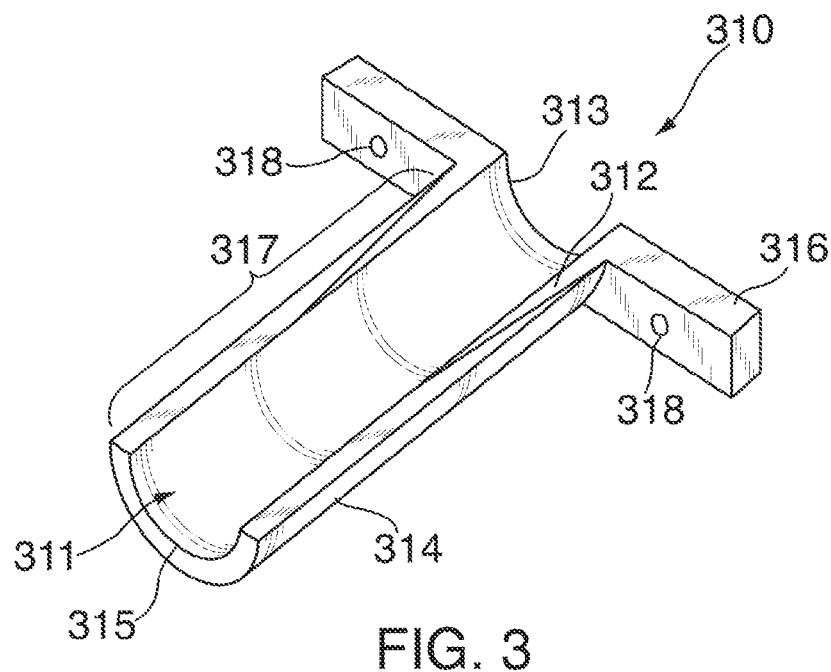
FIG. 3 shows a cross-sectional perspective view of a dual material strain-relief member in accordance with some embodiments.

FIG. 3 is a cross-sectional perspective view of illustrative dual material strain-relief member 310 in accordance with some embodiments. Dual material strain-relief member 310 includes a housing engagement member 316 and a strain-relief part 317, both of which may include parts of an inner strain-relief portion 312, and an outer strain-relief portion 314. Housing engagement member 316 may also, according to some embodiments, include retention holes 318. A cable receiving passage 311 is configured to receive a cable (e.g., cable 120 of FIG. 1) and includes a first end 313 and a second end 315.

Flexibility increases with decreased inner strain-relief portion thickness and decreases with increased inner strain-relief portion thickness. Using this generalization as a design roadmap, it can be appreciated that dual material strain-relief member 310 is tuned to be more flexible near second end 315 than at first end 313. The thickness of inner strain-relief portion 312 tapers off near second end 315, and as a result of this thinning, dual material strain-relief member 310 is more flexible at second end 315 than at first end 313. Because outer strain-relief portion 314 can be formed from a relatively soft material, its thickness can remain constant, or even increase, without significantly affecting the overall flexibility characteristics of dual material strain-relief member 310, as controlled by the shape of inner strain-relief portion 312.

Accordingly, dual material strain-relief member 310 may be designed to provide stiff support for a cable at first end 313 (e.g., the portion of dual material strain-relief member 310 where a cable interfaces with a connector housing). The thickness of inner strain-relief portion 312 decreases moving from first end 313 towards second end 315, thereby allowing for increasingly more cable flex along the length of strain-relief part 317 as the cable approaches second end 315. With dual material strain-relief member 310 tuned in this manner, the strain on the cable near second end 315 is substantially mitigated.

According to some embodiments, all or a portion of the inner surfaces of inner strain-relief portion 312 and outer strain-relief portion 314 can be contact with the cable (not shown) in cable receiving passage 311. In some embodiments, for example, the cable may be free floated within cable receiving passage 311 (i.e., not physically bonded to the inner surfaces of inner strain-relief portion 312 and outer strain-relief portion 314). In other embodiments, the cable can be bonded (by a thermal bond or an adhesive) to at least a portion of the inner surfaces of inner strain-relief portion 312 and outer strain-relief portion 314.

Housing engagement member 316 may be coupled to a connector housing (e.g., connector housing 130 of FIG. 1). This portion can be secured within the connector housing with, for example, an adhesive, thermal bond, one or more mechanical clips, or any other suitable retention mechanism. In some embodiments, retention holes 318 may be configured to engage one or more clips or posts to hold dual material strain-relief member 310 in place during assembly. In other embodiments, the housing engagement member of dual material strain-relief member 310 may be coupled to the outer surface of the connector housing. Any suitable method for securing strain-relief member 310 may be employed. For example, dual material strain-relief member 310 can be directly coupled to the outer surface of the connector housing with an adhesive or thermal bonding.

Figure 4:
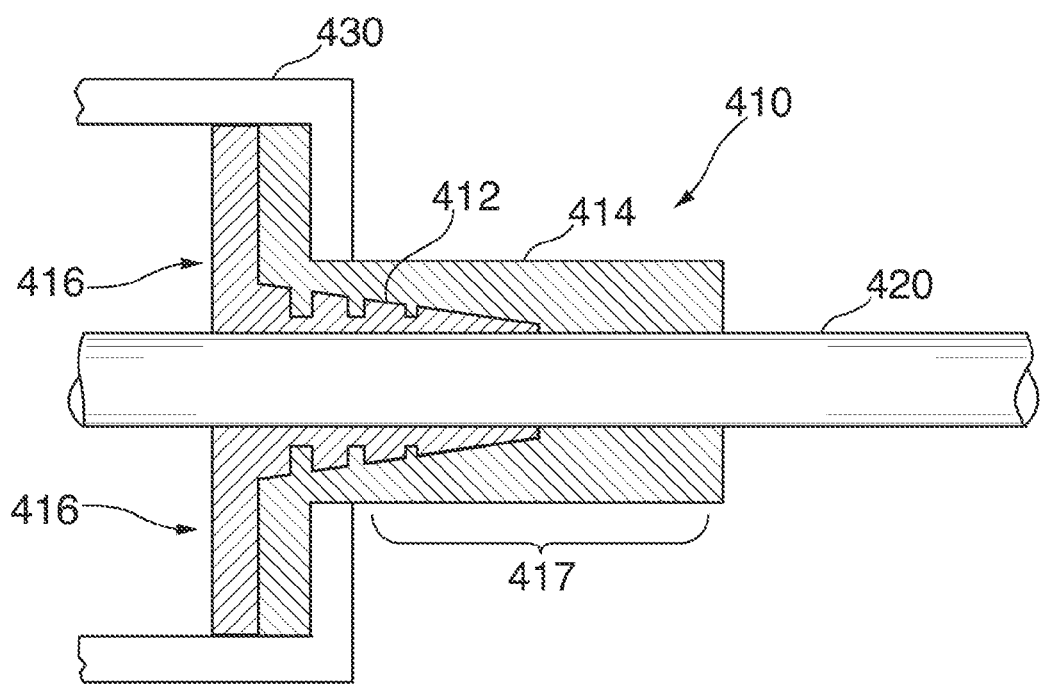
FIG. 4 is a cross-sectional view of cable assembly, including a dual material strain-relief member partly contained within a connector housing in accordance with some embodiments.

FIG. 4 is a cross-sectional view of cable assembly 400, including a dual material strain-relief member 410 partly contained within a connector housing 430 in accordance with some embodiments. Dual material strain-relief member 410 can include inner strain-relief portion 412 and outer strain-relief portion 414, which surround cable 420 proximate to the location at which the cable enters connector housing 430. The section of dual material strain-relief member 410 that extends outside of connector housing 430 may be referred to as strain-relief part 417.

As discussed above with respect to FIG. 3, the section of dual material strain-relief member 410 within connector housing 430 may be referred to as a housing engagement member 416. Housing engagement member 416 may, as depicted in FIG. 4, be formed partly from a section of inner strain-relief portion 412 and partly from a section of outer strain-relief portion 414. In these embodiments, housing engagement member 416 can serve to secure both inner strain-relief portion 412 and outer strain-relief portion 414 within cable assembly 400. In other embodiments, housing engagement member 416 may be formed wholly from inner strain-relief portion 412 or outer strain-relief portion 414, or housing engagement member 416 may be formed separately and physically coupled to inner strain-relief portion 412 and/or outer strain-relief portion 414 in any suitable manner (e.g., using an adhesive, thermal bonding, and/or a retention mechanism).

Inner strain-relief portion 412 may include one or more interlocks 419. Interlocks 419 may be provided to promote adhesion between inner strain-relief portion 412 and outer strain-relief portion 414. In particular, interlocks 419 can help to ensure that the various components of cable assembly 400 remain in place even when cable 420 is bent, pulled, or otherwise manipulated. Interlocks 419 of inner strain-relief portion 412 (and the corresponding fill shapes of outer strain-relief portion 414) may be formed during a molding process, as part of a fiber weave, or in a subsequent machining step, for example.

Figure 5:
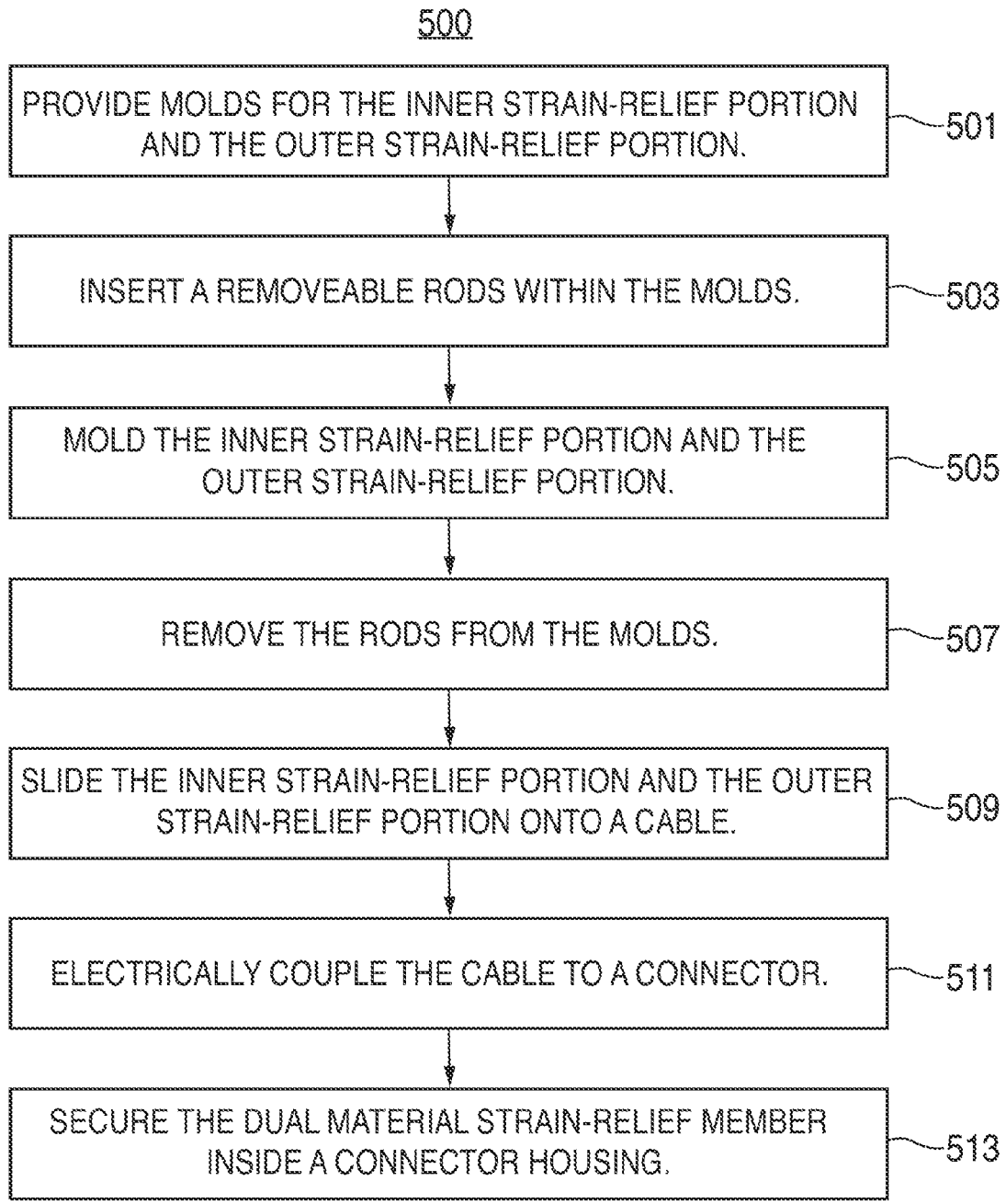
FIG. 5 is an illustrative flowchart of a method for manufacturing a cable assembly with a dual material strain-relief member in accordance with some embodiments.

FIG. 5 is an illustrative flowchart of a method 500 for manufacturing a cable assembly with a dual material strain-relief member in accordance with some embodiments. Beginning at step 501, molds are provided for forming inner and outer strain-relief portions. The mold provided for the inner strain-relief portion can form the outer dimensions of the housing engagement part and the strain-relief part. In particular, the outer dimensions of the inner strain-relief portion can have a tapered shape, which is thickest at the end proximal to the housing engagement part, and thinnest at the end distal to the housing engagement part. The mold provided for the outer strain-relief portion can have outer dimensions that are aesthetically pleasing. For example, the outer surface of the outer strain-relief portion can be smooth and cylindrically shaped.

At step 503, a removable rod can be positioned within the molds and held in place during a molding step. Each rod can be shaped to ensure that the inner dimensions for each of the inner and outer strain-relief portions are sized appropriately. For example, the rod positioned within the inner strain-relief portion can be configured to create a cable receiving passage (e.g., cable receiving passage 311 of FIG. 3). Similarly, the rod positioned within the outer strain-relief portion can be configured to create a cable receiving passage configured to further receive the inner strain-relief portion. In some embodiments, alternatively, the outer strain-relief portion may be overmolded over the inner strain-relief portion using, for example, an injection molding process, thereby obviating the need to provide a specially shaped rod for the outer strain-relief portion.

At step 505, the inner and outer strain-relief portions are molded using the molds and removable rods. In one embodiment, compression molds may be used to mold the stress-relief members. Compression molds may be made using any number of different techniques. In one approach, silicone sheets can be molded around the rod. In another approach, a combination of urethane sheets and foam can form the stress-relief member. In another embodiment, an injection mold process may be used to mold the stress-relief member. At step 507, the removable rods can be removed to yield the inner and outer strain-relief portions.

At step 509, the inner and outer strain-relief portions can be slid onto a cable to begin assembly of a cable assembly (e.g. cable assembly 100 of FIG. 1). In particular, the cable can be inserted into the cable receiving passage formed in the inner and outer strain-relief portions. In some embodiments, the inner and outer strain-relief portions may be coupled together before being incorporated into the cable assembly. The strain-relief portions may be coupled together with, for example, an adhesive, interlocks (e.g., interlocks 419 of FIG. 4), thermal bonding, and/or combinations of these and other suitable methods (e.g., overmolding the outer strain-relief portion over the inner strain-relief portion) to form the dual material strain-relief member. In other embodiments, the inner and outer strain-relief portions can be slid onto the cable separately and positioned such that the outer strain-relief portion forms an aesthetically pleasing sleeve over the tapered inner strain-relief portion. When the two strain-relief portions are thus joined, they form the dual material strain-relief member.

At step 511, the cable can be electrically coupled to a plug (e.g., plug 132 of FIG. 1). Electrical coupling between the cable and plug can include, for example, solder connections between individual wires in the cable and electrically conductive contacts on the plug. Next, at step 513, the dual material strain-relief member and the electrical connection between the cable and the plug can be secured within a connector housing. The connector housing may, for example, snap together around the electrical connection and the dual material strain-relief member.

Figure 6:
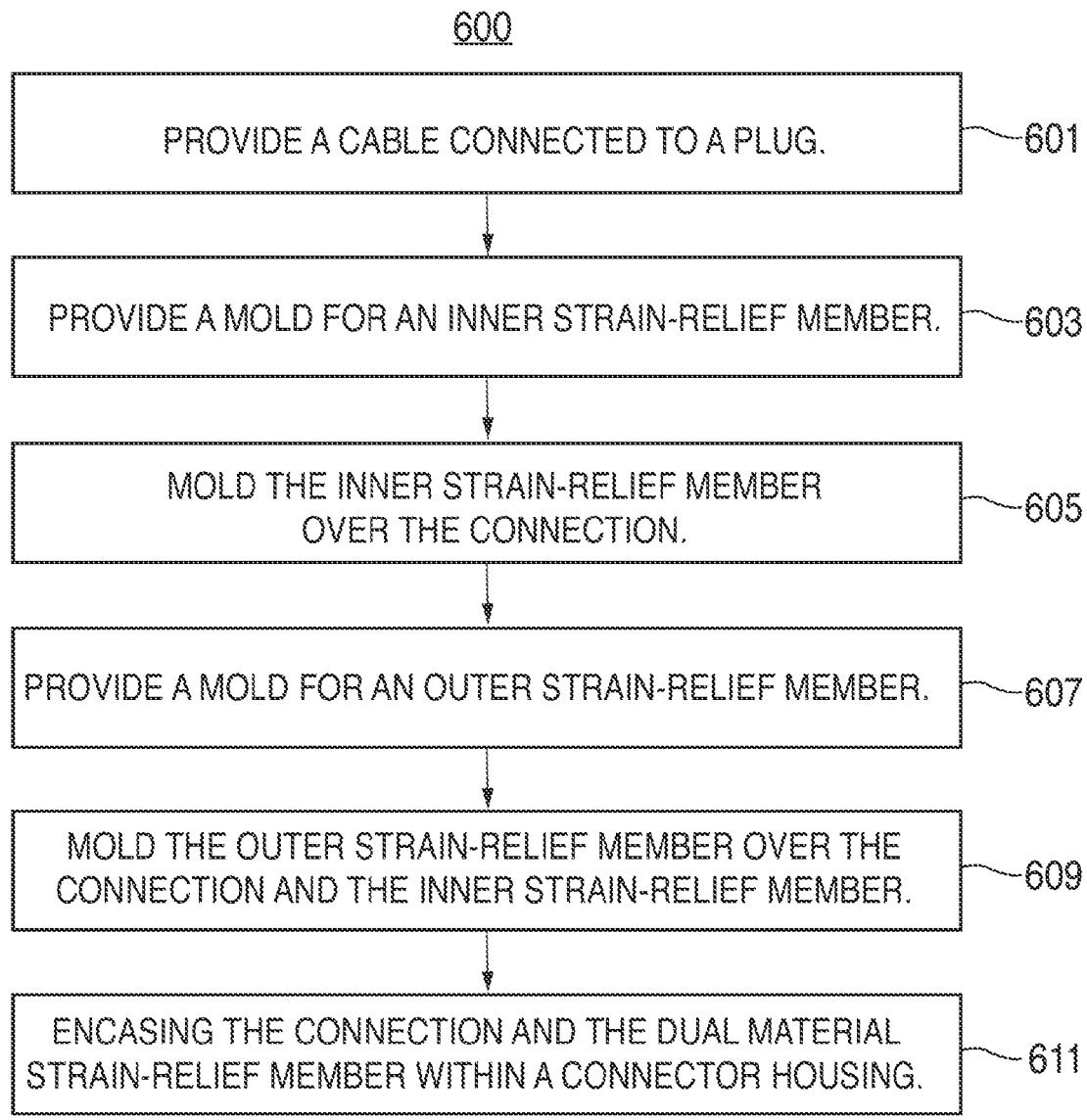
FIG. 6 is an illustrative flowchart of another method for manufacturing a cable assembly with a strain-relief member in accordance with some embodiments.

FIG. 6 is an illustrative flowchart of another method 600 for manufacturing a cable assembly with a strain-relief member in accordance with some embodiments. At step 601, a cable structure can be provided that includes a cable electrically coupled to a plug. Electrical coupling between the cable and plug can include, for example, solder connections between individual wires in the cable and electrically conductive contacts on the plug.

Next, at step 603, a mold can be provided for forming an inner strain-relief portion. The mold may define the outer dimensions of the inner strain-relief portion such that the final product has a tapered shape extending from an end proximal to a housing engagement member to a second end, distal to the housing engagement member. Furthermore, the mold can include features for forming interlocks in the surface of the inner strain-relief portions (e.g., interlocks 419 of FIG. 4).

At step 605, the inner strain-relief portion can be overmolded over the electrical coupling between the cable and the plug. The molding process may be, for example, an injection molding process in which the cable structure is inserted into a mold (e.g., the mold provided in step 603). A liquid material can be injected into the mold and allowed to harden around the portion of the cable structure encased within the mold. The outer surfaces of the inner strain-relief member may be defined by the interior shape of the mold.

At step 607, a mold can be provided for forming an outer strain-relief portion. The mold may define the outer dimensions of the outer strain-relief portion such that the final product has an aesthetically pleasing outward appearance. In some embodiments, the mold for the outer strain-relief portion can define a cylindrical shape for the outer dimensions of the outer strain-relief portion. However, any suitable, aesthetically pleasing shape can be defined by the mold provided in step 607.

At step 609, the outer strain-relief portion can be overmolded over the electrical connection, the inner strain-relief portion (to form a dual material strain-relief member), and a portion of the cable. For example, the outer strain-relief portion can be an injection molding process that is substantially similar to the molding process described in step 605 for the inner strain-relief portion.

Next, at step 611, the electrical connection and a portion of the dual material strain-relief member (e.g., housing engagement member 316 of FIG. 3) can be encased within a connector housing. The connector housing may be formed from a rigid material that can protect the electrical connection as well as the portions of the dual material strain-relief member encased within the connector housing. For example, the connector housing may be formed from a stiff plastic or a metal such as, for example, aluminum.

It is to be understood that the steps shown methods 500 and 600 are merely illustrative and that existing steps may be modified or omitted, additional steps may be added, and the order of certain steps may be altered.

While there have been described dual material strain-relief members for cables and methods for making the same, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A method for making a cable assembly, the method comprising:
   providing a first mold that forms external dimensions of an inner strain-relief portion and a second mold that forms external dimensions of an outer strain-relief portion;
   securing a first removable rod within the first mold and a second removable rod within the second mold during a molding step, wherein the first rod is shaped to ensure a cable receiving passage is formed and the second removable rod is shaped to ensure that internal dimensions of a portion of the outer strain-relief portion correspond to the external dimensions of the inner strain-relief portion;
   molding the inner strain-relief portion and the outer strain-relief portion using the first and second molds and the first and second removable rods;
   removing the first and second removable rods to yield the inner strain-relief portion and the outer strain-relief portion; and
   sliding the inner strain-relief portion and the outer strain-relief portion onto a cable, such that the outer strain-relief portion forms a sleeve over the inner strain-relief portion to form a dual material strain-relief member, such that at least a portion of the inner strain-relief portion contacts a first portion of the cable, and such that another portion of the outer strain-relief portion contacts a second portion of the cable.

2. The method of claim 1, further comprising coupling together the inner strain-relief portion and the outer strain-relief portion to form the dual material strain-relief member.

3. The method of claim 2, further comprising securing a portion of the dual material strain-relief member inside a connector housing.

4. The method of claim 3, wherein the portion of the dual material strain-relief member comprises a housing engagement member.

5. The method of claim 3, wherein the portion of the dual material strain-relief member comprises a housing portion of the inner strain-relief portion and a housing portion of the outer strain-relief portion.

6. The method of claim 5, wherein the housing portion of the inner strain-relief portion is perpendicular with respect to the cable receiving passage.

7. The method of claim 6, wherein the housing portion of the outer strain-relief portion is perpendicular with respect to the cable receiving passage.

8. The method of claim 2, further comprising securing a portion of the dual material strain-relief member to an outside portion of a connector housing, wherein the portion of the dual material strain-relief member comprises a housing portion of the inner strain-relief portion.

9. The method of claim 1, further comprising electrically coupling the cable to a plug.

10. The method of claim 1, wherein the inner strain-relief portion and the outer strain-relief portion are formed from one of insert molding and compression molding.

11. The method of claim 1, wherein:
at least a portion of an outer surface of the inner strain-relief portion is cone-shaped; and
at least a portion of an inner surface of the inner strain-relief portion is cylindrically-shaped.

12. The method of claim 1, wherein:
the molding the inner strain-relief portion comprises molding the inner strain-relief portion using a first material within the first mold and around the first removable rod;
the molding the outer strain-relief portion comprises molding the outer strain-relief portion using a second material within the second mold and around the second removable rod; and
the first material is harder than the second material.

13. The method of claim 1, wherein:
the molding the inner strain-relief portion comprises molding the inner strain-relief portion using a first material within the first mold and about the first removable rod;
the molding the outer strain-relief portion comprises molding the outer strain-relief portion using a second material within the second mold and about the second removable rod; and
the Type A durometer of the first material is at least 10 less than the Type A durometer of the second material.

14. The method of claim 1, further comprising securing an engagement portion of the inner strain-relief portion to a connector housing.

15. The method of claim 1, wherein the securing comprises securing the engagement portion of the inner strain-relief portion to the connector housing using at least one of an adhesive, thermal bonding, and a retention mechanism.

16. The method of claim 1, wherein no portion of the outer strain-relief portion is secured to the connector housing.

* * * * *